United States Patent
Schinke et al.

(10) Patent No.: US 7,862,333 B2
(45) Date of Patent: Jan. 4, 2011

(54) REGULATOR FOR THE COOLING AIR INFLOW OF A COOLING GRATE

(75) Inventors: Karl Schinke, Köln (DE); Christian Splinter, Pulheim (DE)

(73) Assignee: KHD Humboldt Wedag GmbH, Cologne (DE)

( * ) Notice: Subject to any disclaimer, the term of this patent is extended or adjusted under 35 U.S.C. 154(b) by 701 days.

(21) Appl. No.: 11/665,952

(22) PCT Filed: Oct. 14, 2005

(86) PCT No.: PCT/EP2005/011055

§ 371 (c)(1),
(2), (4) Date: Nov. 19, 2007

(87) PCT Pub. No.: WO2006/045446

PCT Pub. Date: May 4, 2006

(65) Prior Publication Data

US 2008/0173352 A1    Jul. 24, 2008

(30) Foreign Application Priority Data

Oct. 23, 2004   (DE) .................. 10 2004 051 698

(51) Int. Cl.
*F27D 15/02* (2006.01)
(52) U.S. Cl. .................. 432/77; 432/78; 110/270
(58) Field of Classification Search .................. 432/77, 432/78; 110/268, 270; 165/104.16, 104.18
See application file for complete search history.

(56) References Cited

U.S. PATENT DOCUMENTS

| 4,108,418 A | 8/1978 | Ensign et al. |
| 5,149,266 A * | 9/1992 | Heinemann et al. ........... 432/77 |
| 2002/0014607 A1* | 2/2002 | Abromaitis .................. 251/7 |
| 2006/0192159 A1* | 8/2006 | Kopp ........................ 251/5 |
| 2008/0087853 A1* | 4/2008 | Kees ......................... 251/5 |
| 2009/0101310 A1* | 4/2009 | Fons ...................... 165/104.16 |

FOREIGN PATENT DOCUMENTS

| DE | 72 08 359 | 6/1972 |
| DE | 200 20 636 | 3/2001 |
| EP | 0 848 646 | 6/1998 |
| EP | 1 021 692 | 7/2000 |
| JP | 07248151 | 9/1995 |
| WO | WO 02/06748 | 1/2002 |

* cited by examiner

*Primary Examiner*—Gregory A Wilson
(74) *Attorney, Agent, or Firm*—Greer, Burns & Crain, Ltd.

(57) ABSTRACT

In order to provide, for a grate cooler for cooling hot bulk material, such as, for example, cement clinker, an, in particular, automatically operating cooling air regulator which has a simple construction and can be used without difficulty both for unmoved and, in particular, for moved cooling grate regions or moved cooling grate systems, for example, cylindrical hose sleeve comprised of elastic material be tension-mounted as an actuating member coaxially in the regulator housing which is arranged below the cooling grate, participates in the movements of the latter and has a casing comprised of solid material, the pressure difference inside and outside the hose sleeve and the deformation resistance of the sleeve being set such that the hose sleeve is deformable, in particular, automatically from its maximum flow cross section into its minimum flow cross section and at the same time regulates the volume flow of the cooling air flow from below into the cooling grate.

17 Claims, 5 Drawing Sheets

REGULATOR FOR THE COOLING AIR INFLOW OF A COOLING GRATE

BACKGROUND OF THE INVENTION

The invention relates to a device for regulating the flow cross section in the cooling air inflows of a bulk material grate cooler for cooling a hot bulk material, such as, for example, cement clinker, with a regulator housing which is integrated into the cooling air inflow below the cooling grate and in which an actuating member moves in such a way that a rise in the flow velocity in the region of the actuating member and, along with this, an incipient rise in the cooling air throughflow quantity bring about a reduction in the free flow cross section, and vice versa.

On a cement clinker production line, the hot cement clinker burnt in a rotary tubular kiln from calcined raw cement meal is thrown off from the kiln discharge end onto a cooler, as a rule onto the cooling grate of a grate cooler, is distributed on this and is moved by suitable conveying means in the longitudinal direction to the cooler discharge end, cooling air flows passing through the cooling grate and hot bulk material layer essentially from the bottom upward. The known grate cooler types are explained briefly below.

In a push-type grate cooler, as seen in the conveying direction, fixed grate plate rows alternate with movable grate plate rows which can move back and forth and all grate plates are provided with cooling air ports, cooling air flowing through them essentially from the bottom upward, and, due to the jointly oscillating movement of all the movable grate plate rows, the hot material to be cooled is transported in pushes and is at the same time cooled. As an alternative to such a push-type grate cooler, for example, EP-B-1 021 692 discloses a grate cooler type in which the cooling grate through which cooling air flows is not moved, but, instead, is stationary, a plurality of rows of adjacent beam-shaped pushing elements movable back-and-forth being arranged above the stationary grate surface and being moved between a forward-stroke position in the direction of transport of the material to be cooled and a reverse-stroke position, so that, owing to the movement of these pushing elements back-and-forth in a material bed to be cooled, the material is likewise successively moved from the start of the cooler to the end of the cooler and is at the same time cooled.

In grate coolers of this type, unequal distributions in the hot bulk material bed in terms of the bulk material bed height, clinker grain size, temperature profile, etc. cannot always be avoided, thus resulting in uneven cooling. This is because, in cooling grate regions having a greater bulk material bed height, the flow resistance for the cooling air rises, the flow velocity falls and less cooling air is conducted through the bulk material bed, and, conversely, in cooling grate regions with a low bulk material bed height, the flow resistance for the cooling air falls, the flow velocity of the latter and the risk of an inrush of air increase, and too high a cooling air quantity is conducted precisely through those bulk material bed regions which would require the lowest cooling air quantity.

It is therefore known (EP-B-0 848 646), in a grate cooler for the cooling of hot bulk material, such as cement clinker, to regulate the respective cooling air quantity automatically in the cooling air inflows below the cooling grate in each case such that, with an incipient rise in the cooling air throughflow quantity caused by a decreasing bed height of the material to be cooled and a falling flow resistance, the clear cross-sectional area of the respective cooling air inflow lines is reduced, and vice versa, in order thereby to compensate a changing pressure drop across the bed of material to be cooled, so that the respective cooling air quantity is no longer dependent on the respective pressure loss or flow resistance of the cooling air in the respective zone of the bed of material to be cooled. In this case, the known mechanical cooling air throughflow quantity flow regulator operates with a weight-loaded pendulum flap with a horizontally lying pivot axis, the pendulum flap automatically throttling the respective cooling air inflow to a greater or lesser extent according to the prevailing pressure conditions and flow conditions. If the known cooling air regulator, which operates with a pivoting lever weight actuated purely by gravity and having inflow bodies, were arranged below the cooling grate in the cooling air inflows of cooling grate zones which are not stationary, but which, instead, are moved back-and-forth, together with regulators, in the case of a push-type grate cooler for the purpose of transporting the bulk material, then the automatic regulation of the regulator would be disturbed by the back-and-forth shaking movement and the regulation result would thereby be falsified.

WO-02/06748 also discloses, in a bulk material grate cooler, a cooling air regulator, in which a round stationary segmental disk provided with passage ports is arranged below the grate in the cooling air supply line and a vane disk held rotationally movably on a shaft is arranged above said segmental disk, said vane disk rotating as a function of the flow velocity of the cooling air and at the same time automatically varying the clear flow cross section of the segmental disk in such a way that, in the case of a rise in the flow velocity, the vane disk rotates counter to a spring force and the flow cross section is reduced, and vice versa. Even this automatically operating cooling air regulator does not rule out the risk that the functioning of the regulator is disturbed by the pulsating pendulum movement of the cooling grate zones which are movable back-and-forth.

Moreover, pneumatically controlled peristaltic valves as shut-off members are known in line with the conveyance of wear-inducing media, such as sludges and other suspensions containing solids. However, the problem of the conveyance of suspensions containing solids does not arise in a bulk material grate cooler.

SUMMARY OF THE INVENTION

The object on which the invention is based is to design a cooling air regulator such that it operates automatically and such that it is constructed in a simple way and can be used without difficulty both for unmoved and, in particular, for moved cooling grate regions or moved cooling grate systems of a grate cooler for the cooling of hot bulk material, such as, for example, cement clinker. As a particular feature, the regulator is, if appropriate, also to be capable of operating by process control.

This object is achieved, according to the invention, by means of a regulator.

In the cooling air regulator according to the invention, the regulator housing integrated into the respective cooling air inflow below the cooling grate consists of a solid material, for example of steel. A, for example, cylindrical hose sleeve comprised of elastic material is tension-mounted coaxially as an actuating member in this casing at both ends. The pressure difference inside and outside the hose sleeve comprised, for example, of rubber and the deformation resistance of the sleeve are then set such that the hose sleeve can be deformed, in particular automatically, from its maximum flow cross section to a minimum flow cross section, specifically as a function of the cooling air flow velocity or of the static pressure of the cooling air flow or else as a function of the control pressure of the gaseous pressure medium acting on the hose sleeve.

The annular interspace between the outside of the hose sleeve and the inside of the solid casing is acted upon by a gaseous pressure medium via at least one connecting port. If, then, a cooling air stream flows through the elastic hose sleeve of the regulator, the static pressure in the cross section of the hose sleeve falls as a function of the rising flow velocity, and the gaseous pressure medium located in the interspace between the hose sleeve and solid casing expands. In this case, the hose sleeve, having originally a preferably round cross section, is pinched together and deformed so as to be approximately flatly oval, until the force equilibrium between the pressure difference from inside the hose sleeve to the outside and the deformation stresses of the hose is reached. The variation caused thereby in the free flow cross section of the hose sleeve has the effect of an automatic regulation of the cooling air volume flow, in such a way that a rise in the cooling air flow velocity in the region of the elastic hose sleeve brings about a reduction in the cooling air throughflow quantity, and vice versa.

In a kinematic reversal of the abovementioned exemplary embodiment of the invention, according to a further exemplary embodiment the cooling air can flow through the annular space between the outside of the hose sleeve and the inside of the solid casing of the regulator. The inner space of the hose sleeve can then be acted upon by the gaseous pressure medium.

According to a particular feature of the invention, in the cooling air regulator the regulating characteristic curve can be varied by a change in the pressure of the gaseous pressure medium in the pressure space capable of being acted upon, this occurring even while the bulk material grate cooler is in operation.

The regulating characteristic curve reproduces the rise in the cooling air requirement with the rising height of the bed of material to be cooled or with a rising throughflow resistance to the cooling air of the bed of material to be cooled. The regulating characteristic curve may be used, independently of changes in the cooling air flow resistance, to regulate a volume flow of the cooling air which remains essentially constant. However, the cooling air regulation may also be process-controlled, in that the pressure level of the gaseous pressure medium for actuating the deformation of the hose sleeve and consequently the cooling air volume flow are controlled in a directed manner as a function of measured operating parameters of the bulk material grate cooler.

The overall grate cooler has, as seen in the longitudinal direction of the cooler, a plurality of cooling air chambers, the size of which, as a rule, increases toward the cooler end. Each cooling air chamber may have its own regulating characteristic curve which can in each case be varied while the cooler is in operation.

The cooling air regulator according to the invention has a simple construction, is unsusceptible to contamination, is largely maintenance-free and is simple in terms of the adjustment of the regulating characteristic curve, even while the cooler is in operation. When the regulator, which, according to the invention, in particular, operates automatically, is in operation, gravity and mass moments of inertia, which could be detrimental to the functioning of the automatic regulation, do not play any part. The cooling air regulator according to the invention is therefore particularly suitable for use in the bulk material coolers having moved cooling grate regions or moved cooling grate systems, that is to say for the push-type grate coolers initially mentioned and also for cooling grate systems which operate on what is known as the walking floor conveyance principle, as is explained in more detail further below.

BRIEF DESCRIPTION OF THE DRAWINGS

The invention and further features and advantages thereof are explained in more detail with reference to the exemplary embodiments illustrated diagrammatically in the figures in which.

DETAILED DESCRIPTION OF THE DRAWINGS

Figure 1:
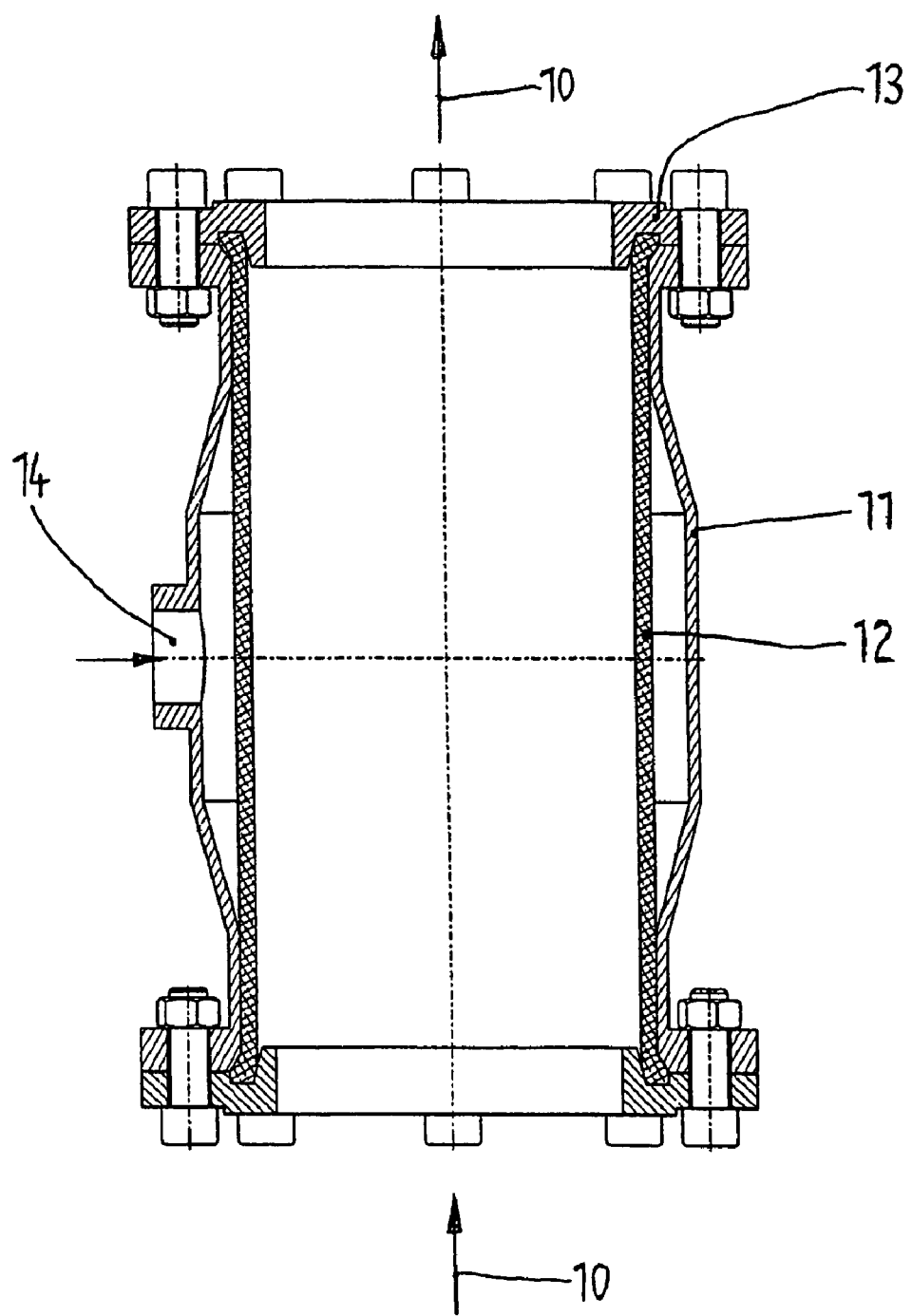
FIG. 1 shows a vertical section through a first embodiment of the cooling air regulator according to the invention with an elastic hose sleeve.
Figure 2:
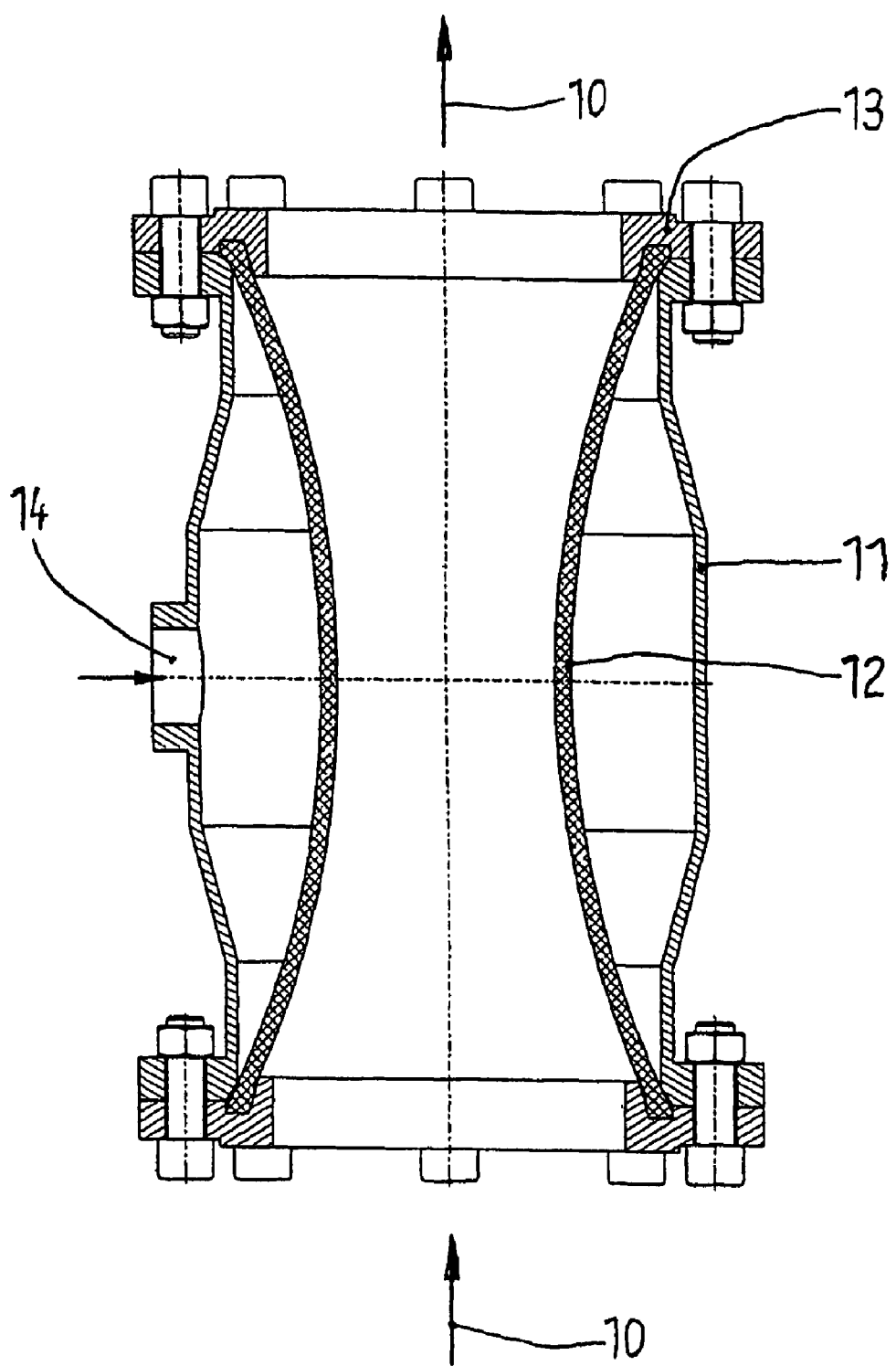
FIG. 2 shows the regulator of FIG. 1 in the throttling position for the cooling air volume flow.
Figure 5:
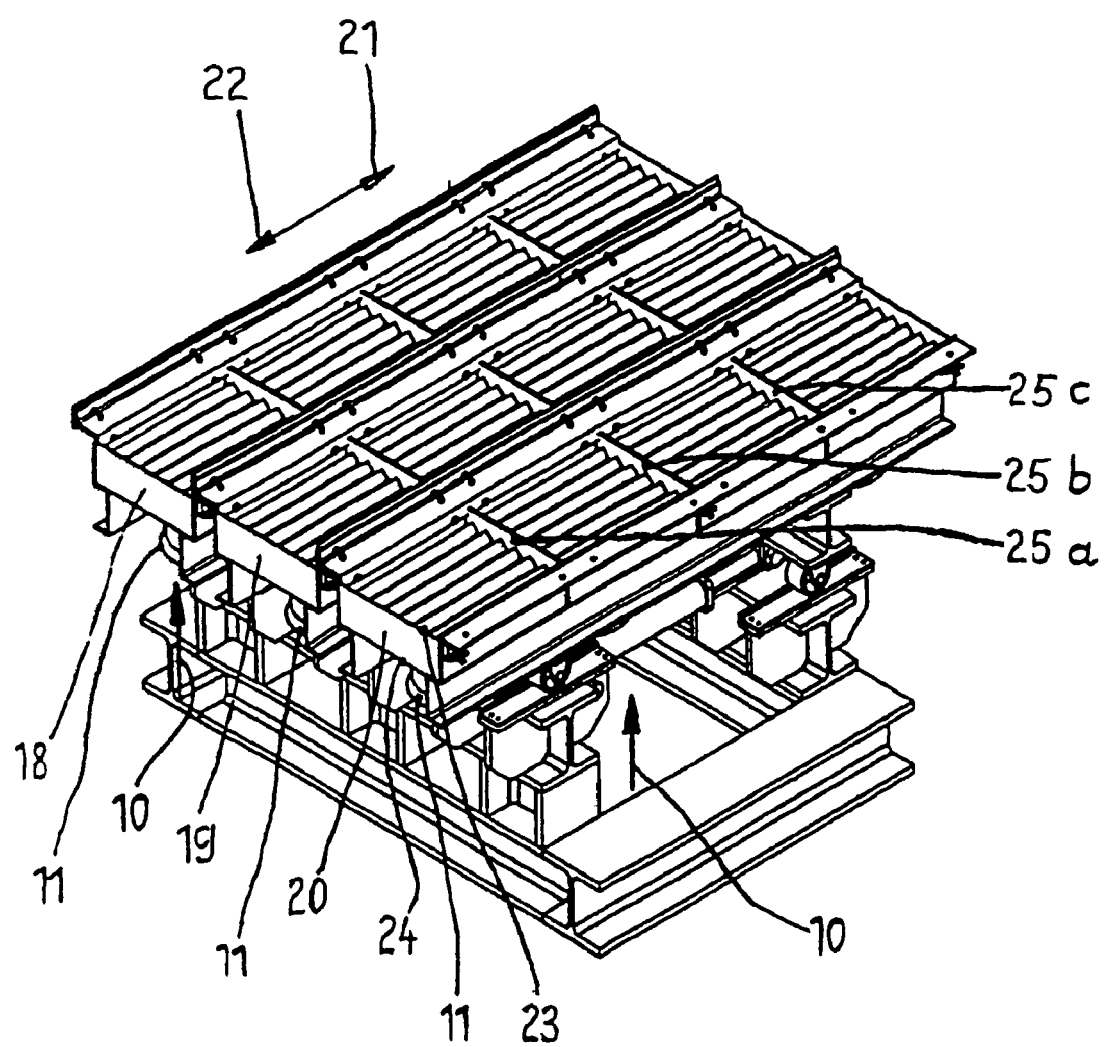
FIG. 5 shows a perspective view of a cooling grate module of a bulk material cooler with cooling air regulators of the abovementioned figures mounted on the cooling grate underside, the cooling grate of a bulk material cooler being composed of a multiplicity of such modules arranged one behind the other and next to one another.

The cooling air regulator of FIG. 1 and FIG. 2, through which the cooling air 10 of a grate cooler flows in order to cool hot bulk material, such as, for example, cement clinker, a multiplicity of such regulators being mounted on the underside of the cooling grate, a detail of which is illustrated in FIG. 5, has an outer casing 11 comprised of solid material, such as, for example, steel, into which a hose sleeve 12 comprised of elastic material, such as, for example, rubber, is tension-mounted as an actuating member coaxially at both ends. The cross section of the casing 11 and hose sleeve 12 is round; however, it could also have an oval or polygonal configuration. The hose sleeve 12 is connected, pressuretight, at each of its two ends to the casing 11 via a clamping ring 13. According to FIG. 1, the annular interspace between the outside of the hose sleeve 12 and the inside of the solid casing 11 is acted upon by a gaseous pressure medium via at least one connecting port 14, which leads to a pneumatic system, not illustrated, the pressure level being adjustable.

If, then, a cooling air stream 10 flows through the hose sleeve 12, the static pressure in the flow cross section of the hose sleeve 12 falls as a function of the rising flow velocity. The gaseous pressure medium present in the space between the casing 11 and sleeve 12 in this case expands. The hose sleeve 12 is pinched together into an approximately oval shape, until the force equilibrium between the pressure difference from inside the hose sleeve 12 to the outside and resulting from the deformation stresses of the hose sleeve is reached. As a result, as is evident from FIG. 2, a reduction in the free flow cross section of the hose sleeve 12 and consequently the desired automatic reduction in the cooling air volume flow in the case of an incipient rise in the flow velocity are achieved, and vice versa.

The deformation resistance of the hose sleeve 12 and consequently also the response behavior of the cooling air regulator according to the invention depend, with the exception of the hose material, on the configuration of the hose sleeve 12, in particular on its wall thickness, stiffening ribs present, hose inserts, etc.

If the flow velocity of the cooling air 10 within the hose sleeve 12 through which it flows rises even higher, for example because the cooling grate section to be cooled by the cooling air is covered only by too small a bulk material bed or is even no longer covered by a bulk material bed, the sleeve 12 therefore does not close off the cooling air flow a cross section completely, but, instead, a minimum flow cross section or a minimum quantity of a cooling air flow 10 is maintained, by virtue of which the cooling grate is protected against overheating. On the contrary, according to the invention, a complete closing of the flow cross section for the flow of the cooling air 10 is possible only by a rise in the pressure of the gaseous pressure medium introduced via the connection 14. Use is made of this possibility, for example, when air cannons, as they are known, with compressed air pulses are used above the cooling grate in the hot bulk material bed in order to loosen the latter, the respective adjacent cooling air regulators according to the invention briefly being closed completely when such air cannons are used, in order to prevent such compressed air pulses from breaking through into the air chambers below the cooling grate.

Conversely, with an increase in the cooling air volume flow, the free flow cross section opens to its maximum value when the cooling air flow begins to collapse due to very high loads of bulk material on the cooling grate zone to be cooled in each case.

Figure 3:
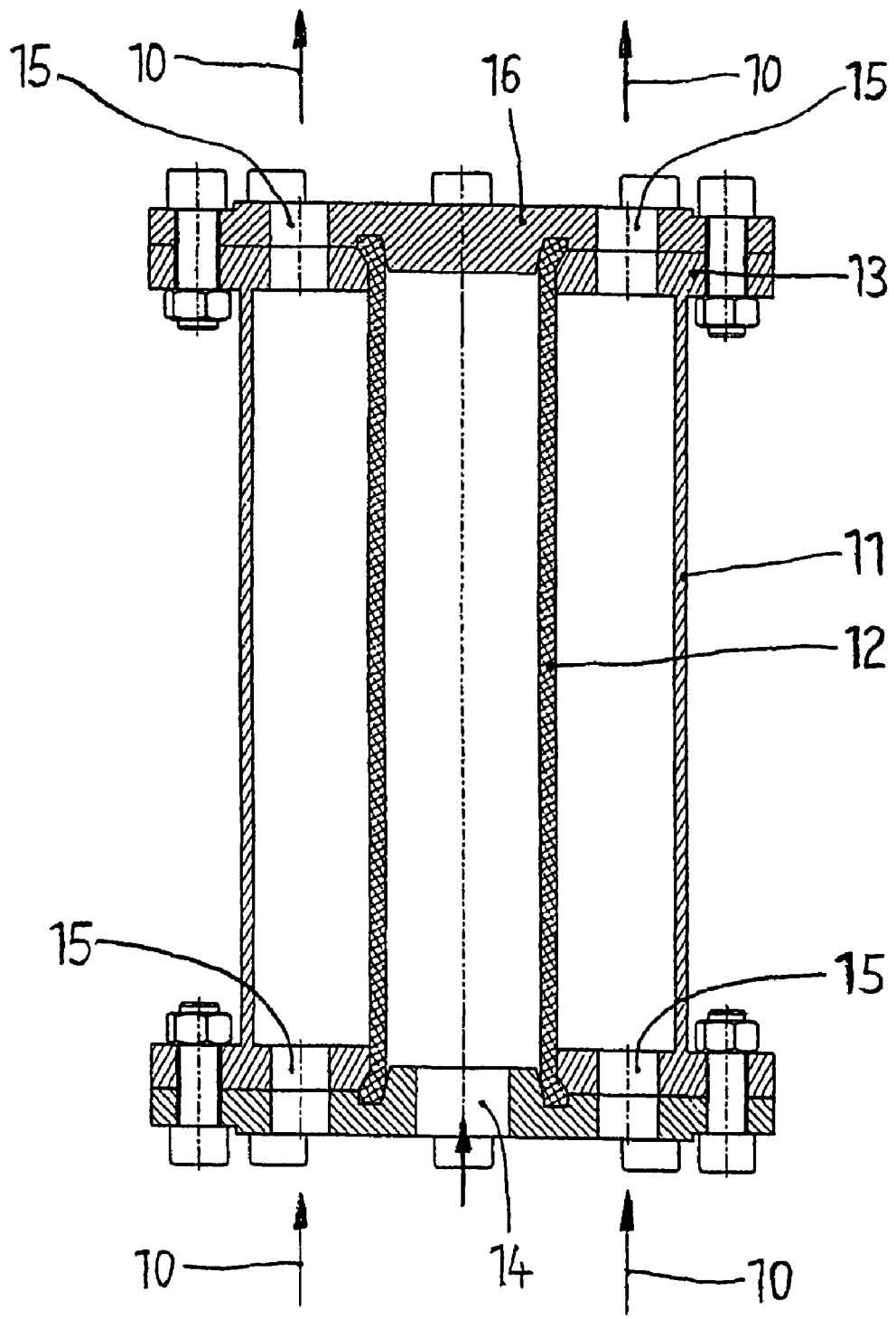
FIG. 3 shows a vertical section through a second embodiment of the cooling air regulator according to the invention with an elastic hose sleeve.
Figure 4:
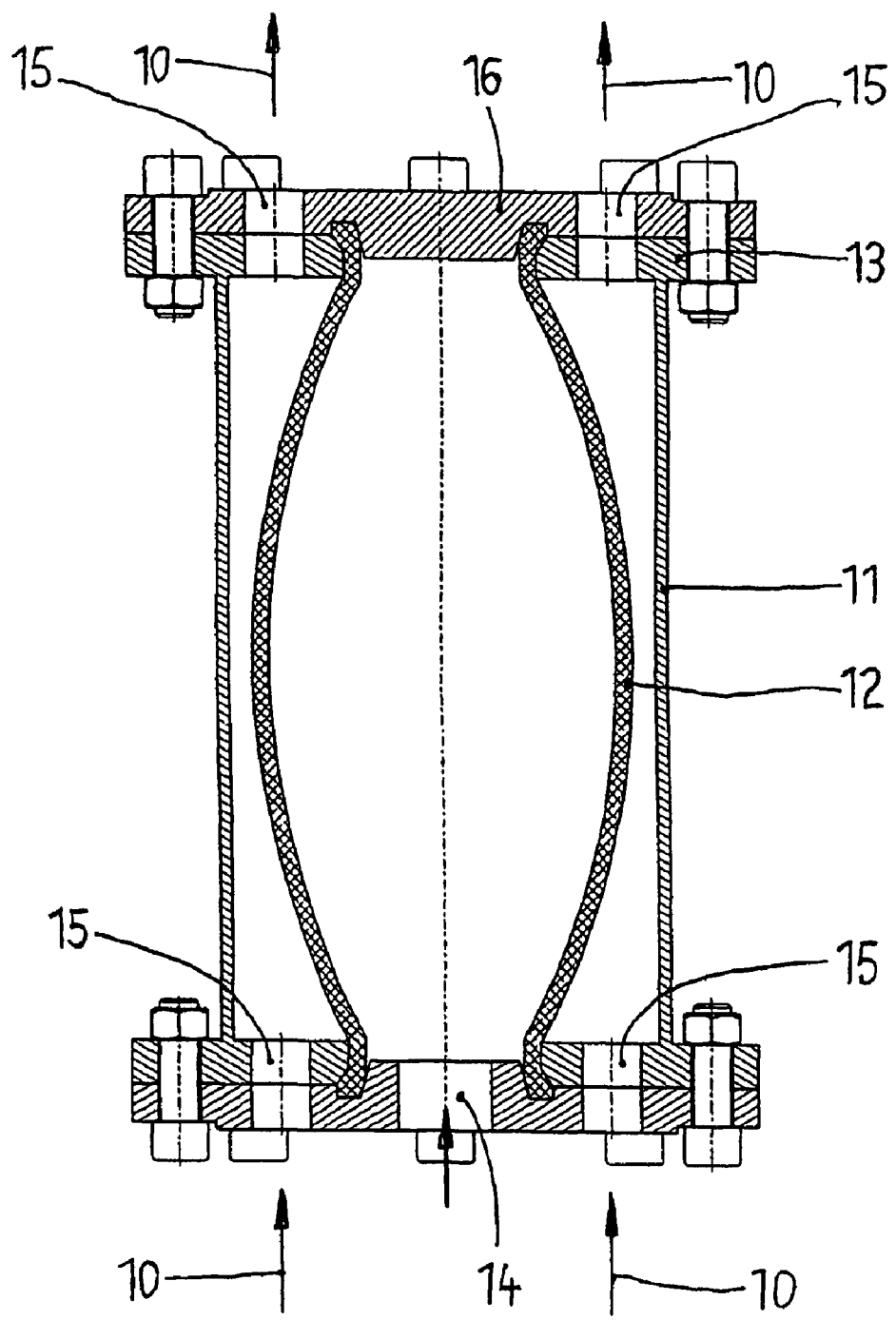
FIG. 4 shows the regulator of FIG. 3 in the throttling position for the cooling air volume flow.

In a kinematic reversal to the exemplary embodiment of FIGS. 1 and 2, in the cooling air regulator according to the invention, shown in FIG. 3 and FIG. 4, the cooling air 10 flows through the annular space between the outer casing 11 and the inner elastic hose sleeve 12 and can flow through bores 15 in the upper and lower clamping ring 13 and in the upper and lower end flange 16 through this annular space. When cooling air 10 flows through this regulator, the static pressure in the annular cross section of the space between the hose sleeve 12 and the casing tube 11 falls as a function of the flow velocity of the cooling air. The gaseous pressure medium which is present inside the hose sleeve 12 and which can be introduced through the connection 14 expands, and, as shown in FIG. 4, the elastic hose sleeve 12 swells up until the force equilibrium between the pressure difference from inside the hose sleeve 12 to the outside and its deformation stresses has been established. The change in cross section occurring as a result gives rise automatically, in turn, to the regulation of the cooling air volume in the desired direction.

According to a further feature of the invention, in the regulator both according to the exemplary embodiment of FIGS. 1 and 2 and according to the exemplary embodiment of FIGS. 3 and 4, the regulating characteristic curve of the regulator can be varied simply and in a direct manner by a change in the pressure of the gaseous pressure medium which is to be introduced through the connection 14 and which is located in the pressure space capable of being acted upon.

It is clear from FIG. 5 that a multiplicity of the cooling air regulators of FIG. 1 and/or, alternatively, FIG. 3 can be flanged with their upper outlet port for the cooling airflow 10 onto the cooling air inlet ports on the underside of a, in particular, moved cooling grate for the supply of cooling air to the latter. Explained by reference to the cooling grate module of FIG. 5, according to the exemplary embodiment each module is composed of three elongate, approximately trough-shaped bottom elements 18, 19, 20 which extend in the longitudinal direction of the cooler and are arranged next to one another and which can be moved in a controlled manner independently of one another between a forward-stroke position 21 in the transport direction of the material to be cooled and a reverse-stroke position 22, so that the hot material, not illustrated there, which is stored on the bottom elements is conveyed in steps through the cooler, for example, on the walking floor conveyance principle. The drive of the individual bottom elements 18, 19, 20 of the cooling grate modules takes place from below the cooling grate via push frames which are supported on running rollers and on which working cylinders engage, specifically in a controlled manner such that the bottom elements are moved jointly forward, but are not moved back jointly, but, instead, separately from one another in time.

The bottom elements 18, 19, 20 of all the modules are designed as hollow bodies, to be precise they have, as seen in cross section, a top side 23 carrying the material to be cooled and permeable to the cooling air 10 essentially from the bottom upward and a closed underside 24 which is spaced apart from the said top side and which prevents material to be cooled from falling through the grate. In this case, the undersides 24 of all the bottom elements have a plurality of cooling air inlet ports which are distributed over the length and to which the cooling air regulators, illustrated in FIG. 1 and FIG. 3, are flanged from below, of which the three regulator housings 11 of the three cooling grate bottom elements 18, 19, 20 which can move independently of one another can be seen in FIG. 5. The cooling grate topsides 23 carrying the hot material to be cooled, such as cement clinker, may, in principle, be provided with any passages permeable to the cooling air 10. Particularly advantageously, the cooling grate top sides 23 may comprise in each case of gable-shaped V-profiles which mirror-symmetrically oppose one another at a distance, but are arranged so as to be offset to one another, and the V-legs of which engage one into the other with an interspace which forms a labyrinth for the material to be cooled and for the cooling air 10. This ensures particularly that the bulk material cooler is protected against a fall through the grate.

It can also be seen in FIG. 5 that webs 25a to 26c lying transversely to the transport direction of the material to be cooled may be arranged on the top side 23 of all the bottom elements 18 to 20 which are permeable to the cooling air 10, for the purpose of retaining the lowermost layer of bulk material and of avoiding a relative movement of this lowermost layer and the respective grate bottom element, thus contributing to protecting these grate bottom elements against wear.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

The invention claimed is:

1. A device for regulating a flow cross section in cooling air inflows of a bulk material grate cooler for cooling a hot bulk material carried on a cooling grate, comprising:
   a regulator housing comprising a casing formed of solid material integrated into the cooling air inflow below the cooling grate,
   an actuating member comprising a hose sleeve formed of elastic material tension-mounted at both ends coaxially in the casing and arranged to move in such a way that a rise in a flow velocity in a region of the actuating member brings about a reduction in a free flow cross section of the cooling air inflow, and vice versa, and
   a pressure difference inside and outside the hose sleeve and a deformation resistance of the sleeve being set such that the hose sleeve is deformable from its maximum flow cross section into its minimum flow cross section by the pressure difference, wherein the cooling air flows through an inside of the hose sleeve, and at least one connecting port communicates with an annular interspace between an outside of the hose sleeve and an inside of the solid casing to introduce a gaseous pressure medium into the interspace.

2. The regulator as claimed in claim 1, wherein the cooling air flows through an annular interspace between an outside of the hose sleeve and an inside of the solid casing, and an inner space of the hose sleeve is arranged to receive a gaseous pressure medium.

3. The regulator as claimed in claim 2, wherein a regulating characteristic curve of the regulator can be varied by a change in a pressure of the gaseous pressure medium in the inner space of the hose sleeve.

4. The regulator as claimed in claim 2, wherein a complete closing of the flow cross section for the cooling airflow is made possible only by a rise in a pressure of the gaseous pressure medium.

5. The regulator as claimed in claim 1, wherein a regulating characteristic curve of the regulator can be varied by a change in a pressure of the gaseous pressure medium in the interspace.

6. The regulator as claimed in claim 1, wherein a complete closing of the flow cross section for the cooling airflow is made possible only by a rise in a pressure of the gaseous pressure medium.

7. The regulator as claimed in claim 1, wherein the elastic hose sleeve comprises a hollow-cylindrical temperature-resistant rubber body which is connected, pressuretight, at its two ends to the casing by clamping rings.

8. The regulator as claimed in claim 1, wherein the elastic hose sleeve comprises a hollow-cylindrical temperature-resistant metal wire mesh body which is connected, pressuretight, at its two ends to the casing by clamping rings.

9. A device for regulating a flow cross section in a cooling air inflow of a bulk material grate cooler for cooling a hot bulk material carried on a cooling grate, comprising:
   a regulator housing comprising a casing formed of solid material positioned in the cooling air inflow below the cooling grate,
   an actuating member comprising a hose sleeve formed of elastic material mounted at both ends in the casing and arranged to move such that a rise in a flow velocity in a region of the actuating member results in a reduction in a free flow cross section of the cooling air inflow, and
   a pressure difference inside and outside the hose sleeve and a deformation resistance of the sleeve being set such that the hose sleeve is deformable from a maximum flow cross section to a minimum flow cross section by the pressure difference, wherein the cooling air flows through an inside of the hose sleeve, and at least one connecting port communicates with an interspace between an outside of the hose sleeve and an inside of the solid casing to introduce a pressure medium into the interspace.

10. The regulator as claimed in claim 9, wherein the cooling air flows through an interspace between an outside of the hose sleeve and an inside of the solid casing, and an inner space of the hose sleeve is arranged to receive a pressure medium.

11. The regulator as claimed in claim 10, wherein a regulating characteristic curve of the regulator can be varied by a change in a pressure of the pressure medium in the inner space of the hose sleeve.

12. The regulator as claimed in claim 10, wherein a complete closing of a flow cross section for the cooling airflow is made possible by a rise in a pressure of the pressure medium.

13. The regulator as claimed in claim 9, wherein a regulating characteristic curve of the regulator can be varied by a change in a pressure of the pressure medium in the interspace.

14. The regulator as claimed in claim 9, wherein a complete closing of a flow cross section for the cooling airflow is made possible by a rise in a pressure of the pressure medium.

15. The regulator as claimed in claim 9, wherein the elastic hose sleeve comprises a hollow-cylindrical temperature-resistant rubber body which is connected, pressuretight, at its two ends to the casing by clamping rings.

16. The regulator as claimed in claim 9, wherein the elastic hose sleeve comprises a hollow-cylindrical temperature-resistant metal wire mesh body which is connected, pressuretight, at its two ends to the casing by clamping rings.

17. A device for regulating a flow cross section in a cooling air inflow of a bulk material grate cooler for cooling a hot bulk material carried on a cooling grate, comprising:
   a regulator housing comprising a casing formed of solid material positioned in the cooling air inflow below the cooling grate, with an airflow passage extending therethrough for the cooling air,
   an actuating member comprising a hose sleeve formed of elastic material mounted at both ends in the casing and arranged to move such that a rise in a flow velocity in a region of the actuating member results in a reduction in a free flow cross section of the cooling air inflow,
   the airflow passage extending through one of an inner space of the hose sleeve and an interspace between an outside of the hose sleeve and an inside of the solid casing and a pressure medium, whose pressure is adjustable, being provided in the other of the inner space and the interspace, and
   a pressure difference inside and outside the hose sleeve and a deformation resistance of the sleeve being set such that the hose sleeve is deformable from a maximum flow cross section into a minimum flow cross section by the pressure difference.

\* \* \* \* \*